United States Patent Office 2,755,293
Patented July 17, 1956

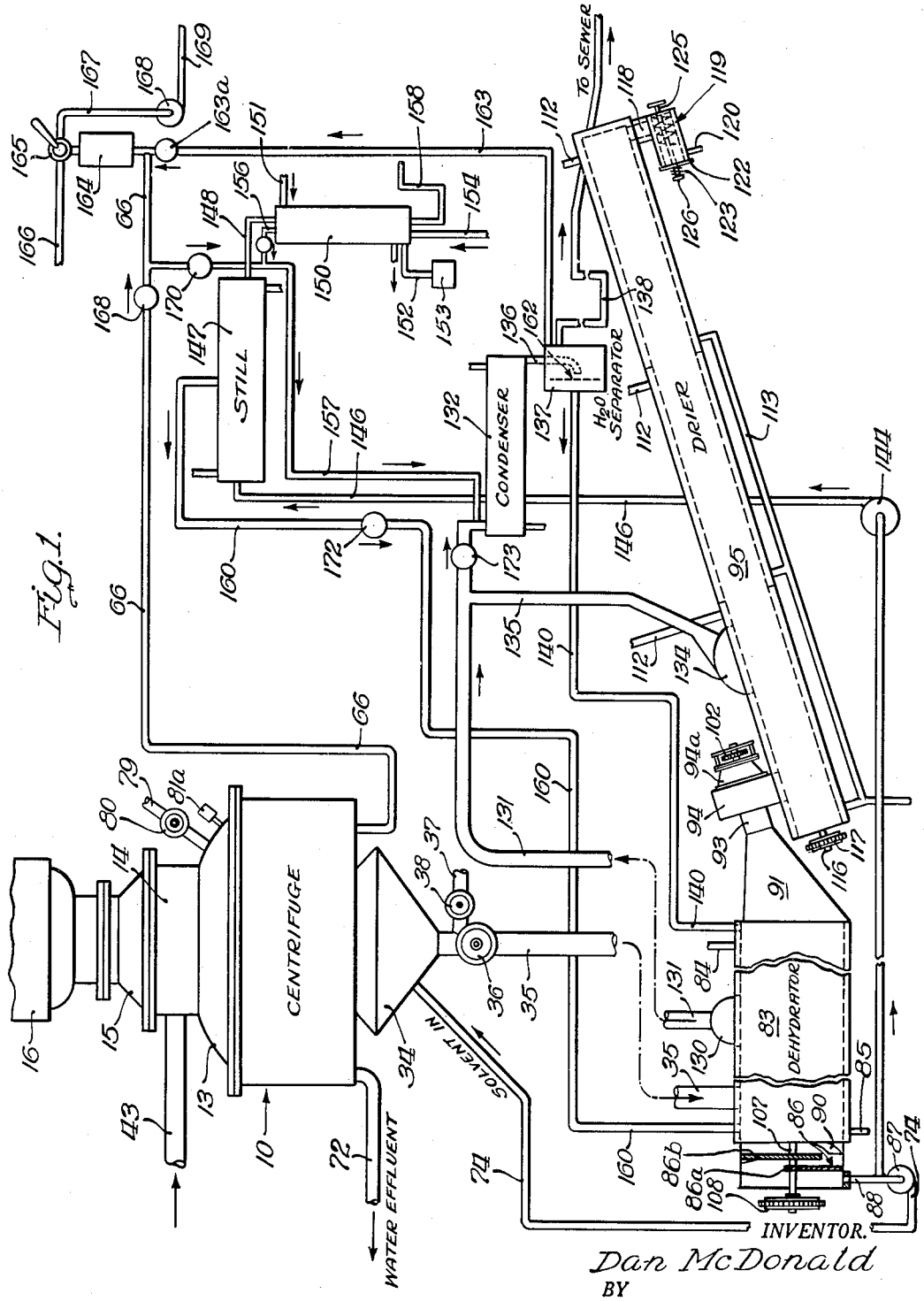

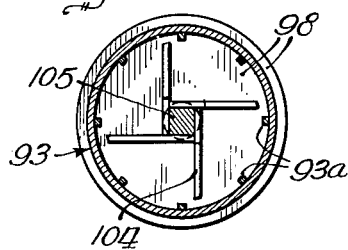

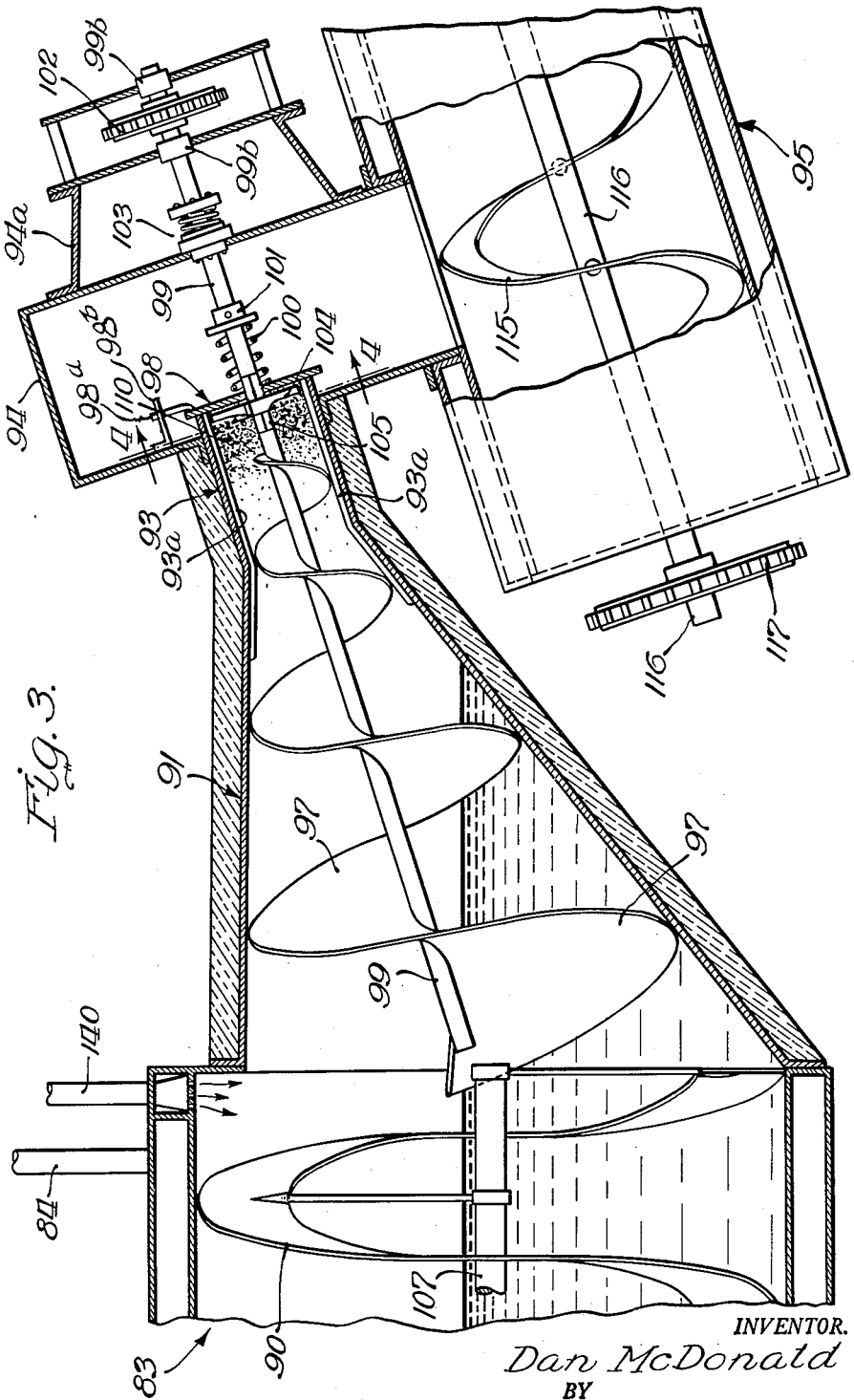

2,755,293

METHOD OF TREATING MATERIALS

Dan McDonald, Aurora, Ill., assignor, by mesne assignments, to Barber-Greene Company, Aurora, Ill., a corporation of Illinois Application December 4, 1951, Serial No. 259,859

1 Claim. (Cl. 260—412.5)

This invention relates to the treatment of products or materials containing suspended solids and, in certain cases, fats, and has to do with the method of treatment of such materials.

Certain waste materials, such, for example, as garbage and sewage, are produced in large volume in communities of appreciable size, particularly in the larger cities and towns. The disposal of such materials while protecting the public health presents a serious problem and necessitates considerable expense. In many instances, garbage and sewage, after preliminary treatment, is discharged into lakes and streams adjacent the community with the risk of contamination of the water and attendant danger to the public health. The method of my invention is particularly adapted, in certain of its aspects, to the treatment of sewage and will be described as used for that purpose, by way of example, it being understood that the method of my invention may be used to advantage for treating many other materials and products containing solids, including waste products, such as garbage, containing organic solids and fats.

Under present practice, sewage entering the treatment plant passes through coarse screens and then through grit chambers, which removes the heavy inorganic matter entrained in the sewage. The sewage is then discharged into large settling tanks, which are primary settling tanks, in which the suspended solids, constituting about forty percent of the total solids, are settled out. The effluent from the primary tanks containing approximately sixty percent of the solids in solution, is delivered to aeration tanks in which it is subjected to agitation by air and to aerobic bacterial action, in which approximately twenty percent of the original solids content is consumed by the bacteria. The effluent from the aeration tanks passes into final settling tanks where the forty percent of the solids therein, rendered insoluble by the bacterial action, settles out, making a total of approximately eighty percent of the original solids content of the sewage which is recovered. The effluent from the final settling tanks is discharged into adjacent rivers or lakes. The raw sludge from the primary settling tanks and the activated sludge from the final settling tanks is delivered to digesters, a sufficient amount of the activated sludge being returned to the aeration tanks to maintain the bacteria count therein. The sludge in the digesters is subjected to anaerobic digestion and is then drained into drying beds and dried. However, in the event of heavy rains much of this sludge, which is not entirely sterile, may be washed into adjacent water courses or lakes which become polluted thereby with danger to the public health. In some cases, the sludge from the digesters is coagulated, usually by ferric chloride, at a cost of approximately five dollars per ton for the ferric chloride, and is then filtered. The filtered sludge usually contains approximately fifteen percent solids and may be dried and sold for fertilizer, or burned. In some cases the primary sludge and the final sludge is not digested but after chemical treatment, which is necessary, is dewatered in continuous filters and is then dried or burned. Under the present digestion process as above outlined, a minimum of approximately thirty days is required for treatment of the sewage.

My invention is directed to a method whereby waste materials of the character referred to, particularly sewage, may be treated in a continuous operation and without necessity for retaining it for a substantial length of time, so that the sludge from the primary settling tanks may be treated directly and, in cases where the amount of sewage to be treated is comparatively small, the raw sewage itself may be treated without passing through primary settling tanks. In practicing the method of my invention, the sewage sludge from the primary settling tanks, or the raw sewage, as the case may be, is stratified by centrifugal action, without chemical treatment or coagulation, so as to separate it into strata of organic solids, water and fats, without chemical aid or chemical coagulation means, with the stratum of water between the strata of organic solids and fats, and the outer face of the stratum of organic solids is continuously washed or flushed by a solvent having a greater specific gravity than the organic solids and maintained thereby out of contact with the stratum of water. The solvent and the solids entrained thereby are continuously discharged, and effluent water from the water stratum is continuously discharged separately from the discharge of the solvent which is thereby maintained out of contact with the water throughout the operation. During the centrifuging operation, the solids provide a barrier or dam between the solvent stratum and the water stratum thereby avoiding contact therebetween during such operation. In that manner, I effectively guard against loss of solvent with the effluent water, which is of primary importance, since the cost of the solvent if discharged with effluent water in substantial amount might render the cost of the method prohibitive. Also, during the centrifuging operation, the separated fats are delivered to the discharged solvent and are readily dissolved therein, from which the fats are later recovered and constitute an important product of the method. The solids removed by the solvent are dehydrated and dried and provide a valuable fertilizer which is friable and hygroscopic in character and contains many trace minerals not present in the usual commercial fertilizers. This fertilizer is free from all putrefacts and is sterile so that it will keep indefinitely without moulding and, when used, will readily deposit its organic and mineral constituents in the soil. In practicing the method of my invention I employ a centrifuge of comparatively simple and inexpensive construction, which is continuous in operation and has high productive capacity, this centrifuge acting to stratify the components of the sewage sludge or sewage and the treating solvent in layers or strata of considerable thickness or depth in the manner above described, while also assuring that the effluent water from the treated sludge or sewage will be discharged separately from the solvent and that the latter will not come into contact with the water constituent of the sewage or sludge, thereby guarding against objectionable loss of solvent in the effluent water discharged from the centrifuge. Further objects and advantages of my invention will appear from the detail description.

In the drawings:

Figure 1 is a diagrammatic view, with parts broken away and in section, of apparatus suitable for practicing the method of my invention;

Figure 2 is a central vertical sectional view of the centrifuge used in the method of my invention, certain parts being shown in elevation and certain parts being broken away;

Figure 3 is a side view, partly in section and partly in elevation, of the discharge end portion of the dehydrator and the lower end portion of the drier, and associated parts, on a considerably enlarged scale relative to Figure 1; and Figure 4 is a sectional view, on an enlarged scale, taken substantially on line 4—4 of Figure 3.

Referring to Figure 2, the centrifuge comprises a cylindrical housing 10 to which is secured, by welding or in other suitable manner, mounting brackets 11 of angle cross section, which are anchored to a plurality of base columns, one of which is shown at 12. Housing 10 is closed, at its top, by a cover 13 of segmo-spherical shape bolted thereto and having an upwardly extending cylindrical neck 14. A closure cap 15 is bolted to the upper end of neck 14 and carries an electric motor 16 bolted thereto. Shaft 17 of motor 16 has driving connection, through a coupling 18 of suitable known type, to the upper end of a drive shaft 19. This shaft 19 is mounted in suitable antifriction bearings 20, of known type, disposed within a mounting column 21 concentric with shaft 19 and extending downwardly within the housing 10 concentrically therewith. Column 21 is connected to cap 15 by a frusto-conical element 22 conveniently formed integral with cap 15 and with column 21. The upper and the lower ends of column 21 are sealed in a suitable known manner, as shown. A tubular member or sleeve 24 extends downward about column 21 in concentric spaced relation thereto, this sleeve 24 being provided at its upper end with an upwardly flaring frusto-conical element 25 bolted to the under face of cover 13. A bowl 26 is mounted within housing 10 in concentric relation therewith. This bowl 26 comprises a cylindrical body 27 and upwardly and downwardly arched concavo-convex top and bottom walls 28 and 29, respectively, secured to body 27 in suitable manner, conveniently by welding. Top wall 28 is provided at its central area with an opening 30 concentric with and extending radially outward beyond the sleeve or tubular member 24. Bottom wall 29 of centrifuge 26 also is provided at its central portion with an opening 31 extending radially outward beyond the axis of shaft 19 a material distance, for a purpose which will appear later. Opening 31 overlies an aligned larger opening 32 at the central portion of bottom wall 33 of housing 10. This opening 32 communicates directly with an underlying discharge launder, shaped as shown, designated 34, from the bottom of which extends a take-off stack 35 controlled by a valve 36 of known type, there being a wash water discharge pipe 37 opening into stack 35 above valve 36 and controlled by a valve 38 of known type. The tubular member or sleeve 24 extends downward to adjacent the lower end of column 21 and defines therewith an annular influent passage 40 open at its lower end. This influent passage 40 opens, at its upper end, into inlet chamber 41 within neck 14 between elements 22 and 25. A pipe or conduit 43 threads into neck 14 for delivery of the influent to chamber 41.

A plurality of vanes 45, of stepped formation, are disposed radially within the bowl 26 and spaced apart circumferentially thereof. The vanes 45 extend between the top and bottom walls 28 and 29 of bowl 26 and are suitably secured thereto, conveniently by welding. A concavo-convex baffle 46 is welded or otherwise suitably secured to the vanes 45 adjacent the lower ends thereof. This baffle 46 is of substantially greater diameter than the bottom discharge opening 31 of bowl 26, overlies opening 31 and extends radially outward therefrom in overlying spaced relation to bottom wall 29 of bowl 26, defining with the latter wall an annular passage 47 opening into bowl 26 radially outward beyond the vanes 45. The baffle 46 is secured, conveniently by welding, to a hub 48 fitting tightly upon the downwardly tapering lower portion 49 of drive shaft 19. A cap nut 50 is threaded upon a reduced screw stud 51 at the lower end of shaft 19 and bears against the lower end of hub 48, holding the latter in tight wedging contact on tapered portion 49 of shaft 19 for rotation therewith. A flanged nut 52 is threaded upon the lower reduced portion of hub 48 and engages beneath a cooperating flange at the upper end of nut 50 for locking the latter against threading off of stud 51. It will be seen that the bowl 26 is mounted, by means of the hub 48 and associated parts, upon the shaft 19 for rotation therewith.

A horizontal annular baffle 54 is secured upon the vanes 45 a short distance below the upper ends thereof and projects radially inward a short distance beyond the inner edges of the vanes 45. A lower substantially frusto-conical baffle 56, inclined radially downward and outward of the bowl 26, is secured to the vanes 45 a short distance above the baffle 46 and in overlying relation to impeller blades 57 secured to the upper end of hub 48 and projecting radially outward therefrom between the vanes 45. It will be noted that the lower end of the tubular element or sleeve 24 is spaced a short distance above the impeller blades 57 for delivering thereto the incoming influent. The impeller blades 57 project the influent radially outward and the baffle 56 directs it downward and outward toward the bottom baffle 46. The vanes 45 are spaced radially outward a short distance from the tubular member or sleeve 24, providing a passage therebetween, and the space between tubular member 24 and the edge of top opening 30 provides an annular effluent discharge passage 59 about the tubular member or sleeve 24. An upwardly and outwardly inclined skirt 60 is secured, conveniently by welding, to top wall 28 of bowl 26 extending from the effluent discharge space 59. The skirt 60 serves to direct effluent discharged through space 59 against the under face of cover 13 of housing 10, from which cover 13 the effluent is deflected downward into housing 10 adjacent the circumferential wall thereof, as will appear more fully later. Fat discharge tubes, one of which is shown at 61, are secured to the vanes 45 and extend upward therealong, with their inner sides slotted or cut away providing elongated openings at the inner edges of the vanes. The tubes 61 extend downward through baffle 56 and through baffle 46, opening into and contiguous to the radially inner opening of passage 47. An annular partition member 62 is secured, conveniently by welding, to bottom wall 33 of housing 10 in concentric spaced relation to the circumferential wall 27 of bowl 26, defining therewith an annular suction space 63 opening at its lower end into the lower portion of housing 10 and thence into the discharge launder 34. The bowl 26 is provided, at the top thereof, with a circumferential flange 64 spaced a short distance above the partition member 62 and overlying the space 62, for a purpose to be described later. A suction tube 66 opens into housing 10, at a point radially inward beyond the partition member 62, so as to be in communication with space 67, between bottom wall 33 of housing 10 and bottom wall 29 of bowl 26, and the annular space 63. The partition member 62 defines, with the circumferential wall 68 of housing 10, an annular space providing a discharge launder 70 for effluent water from the material under treatment discharged through annular space or passage 59, such effluent water being directed by the skirt 60 against the under face of cover 13 of housing 10, and deflected thereby downward into the launder 70, as indicated by the arrows. A discharge conduit or pipe 72 opens through bottom wall 33 of housing 10 into the launder 70, for delivering the water therefrom to a suitable point of discharge. A treating and carrier liquid, to be referred to more fully later, is delivered to passage 47, radially outward thereof, by nozzle 73, disposed in proximity to the radially inner portion of passage 47 and connected by a supply line or pipe 74, passing through a suitable packing means 75 secured through launder 34, to a suitable source of supply of treating and carrier fluid or liquid. The tubular member or sleeve 24 is provided, at one side thereof, with a lengthwise tubular boss 77 closed at its lower end and opening at its upper end into a tubular boss 78 of the frusto-conical element 25. The boss 78 is interiorly threaded at its upper end for reception of a pipe 79 provided with a control valve 80 and connected to a suitable source of supply of water or of solvent under appropriate high pressure. The valve 80 normally is closed. Boss 77 is provided with a series of jet openings 81 disposed to direct water or solvent jets against the inner face of the circumferential wall 27 of the bowl 26, as well as against the under surface of the top wall 28 thereof, as indicated by the arrows. Preferably, a valve 81a, of suitable known type, is mounted on cover 13 for admitting air to housing 10 responsive to creation of a partial vacuum therein of appropriate predetermined value.

The treating and carrier fluid used is a chlorinated hydrocarbon, including perchlorethylene, trichlorethylene, carbon tetrachloride and ethylene dichloride. It may be assumed, for purposes of description, that perchlorethylene is used. The material under treatment, sewage sludge from the primary settling tanks, or raw sewage, is delivered to the bowl 26 in the manner above described and perchlorethylene is delivered to the passage 47 of bowl 26 toward the circumferential wall 27 thereof and under appropriate pressure, by means of the nozzle 73. The bowl 26 is rotated at high speed and the material under treatment is thereby stratified with the organic solids, water and fat contents thereof arranged in accordance with their specific gravities. The specific gravity of the perchlorethylene is 1.62, the specific gravity of the organic solids is approximately 1.05 and the specific gravity of the fat content is approximately 0.8, the specific gravity of the water being one. Accordingly, the perchlorethylene is disposed in an outermost stratum $p$, the organic solids are disposed in a stratum $s$, the water is disposed in a stratum $w$ at the radially inner face of the solids $s$, and the fats are disposed in a stratum $f$ at the radially inner face of the water stratum $w$. It will be seen that the strata are arranged in concentric hollow columns and that the stratum $p$ of the perchlorethylene is maintained out of contact with the water of stratum $w$, by the stratum of solids $s$ which is quite thick and functions as a barrier or dam effectively preventing contact between the water and the perchlorethylene. Also, the heavy inorganic solids are thrown outward by centrifugal force and form a thin layer or stratum $i$ at the inner face of the circumferential wall 27 of bowl 26.

As the layer or stratum of solids $s$ builds up it is forced outwardly along the baffle 46 into the layer of perchlorethylene $p$, from which perchlorethylene is continuously discharged through passage 47 into the launder 34, and to which perchlorethylene is continuously supplied by the nozzle 73. The layer of solids $s$ moves radially outward beyond the edge of baffle 46. As the solids pass over the edge of baffle 46, they rapidly float to the inner face of the solvent at 31 and are discharged, with the solvent, into the launder 34. Also, as the fat layer $f$ builds up, the fat continuously delivered therefrom, through the tubes 61, to the perchlorethylene discharged from passage 47, and is quickly dissolved in such perchlorethylene. The effluent water from the water stratum $w$ is continuously discharged through the annular space 59 and is directed downward into the launder 70, from which it is discharged through a pipe or conduit 72. Preferably the effluent is delivered to tanks in which it is subjected to aerobic bacteria while being agitated with air, from which tanks the treated effluent is delivered to final settling tanks. The solids are settled out in the final settling tanks and the clear liquid is discharged therefrom to a suitable point of discharge. The settled solids may be delivered to the centrifuge for treatment in the manner above, together with the sludge from the primary settling tanks. During operation of the centrifuge, the interior of housing 10 is maintained under partial vacuum, by suitable means connected to the suction line 66, to be described more fully later, for continuously withdrawing therefrom vapors, including any solvent vapors which may occur, so as to prevent solvent losses and also guard against disagreeable odors. Under normal operating conditions, the centrifuge is run for approximately one hour, with the valve 36 in stack 35 open, and valve 38 in the discharge water line 37 closed. After approximately one hour's operation, the supply of influent to the centrifuge is cut off, as well as the supply of perchlorethylene, the centrifuge is emptied, valve 36 is closed and valve 38 is opened, after which water under appropriate pressure is admitted to the tubular boss 77 and the bowl 26 is then rotated at low speed, approximately 5 R. P. M. for about one minute, during which the jets of water issuing through the openings 81 effectively wash the inorganic solids from the inner surface of bowl 26, such solids and the wash water passing downwardly through passage 47 and being discharged through the line 37, as will be clear. Upon completion of the washing operation, valve 38 is closed and valve 36 is opened, after which the centrifuge is operated as before. Alternatively, the valves 36 and 38 may remain in their normal positions, the wash water and entrained solids being discharged through stack 35 into the dehydrator, to be referred to more fully later, particularly when the volume of wash water is not substantial. Also, the bowl may be washed with solvent instead of water, and the solvent and the inorganic solids discharged into the dehydrator.

The solvent—perchlorethylene—together with the entrained solids and dissolved fats passes through stack 35 into a steam jacketed dehydrator 83. The steam jacket of dehydrator 83 terminates a substantial distance from weir 86 and receives steam through pipe 84 and condensate is discharged therefrom through a pipe 85, it being understood that the dehydrator may be provided with the usual steam trap and other accessories. Dehydrator 83 is provided, adjacent one end thereof, with two baffles 86a and 86b providing an overflow weir 86. A centrifugal pump 87 has its intake connected, by pipe or line 88, to the interior of dehydrator 83 at the bottom thereof, between the weir 86 and the adjacent end wall of the dehydrator. The discharge of pump 87 is connected to the solvent supply tube or line 74 leading to the nozzle 73, for continuously supplying perchlorethylene thereto as above described. The solids which float in the dehydrator are advanced to the discharge end thereof by displacement by the incoming solids. A ribbon type conveyor screw 90 is rotatably mounted in dehydrator 83 for moving the settleable material therein toward the discharge end thereof, remote from the weir 86. A substantially frusto-conical member 91 extends from the outlet end of dehydrator 83 at an upward inclination above the normal liquid level therein, which is maintained a short distance above the axis of the conveyor screw 90 so that perchlorethylene continuously overflows the weir 86. The baffle 86b extends a substantial distance below the liquid level, adequate to prevent any solids from overflowing the weir 86. Member 91 is provided with a reduced cylindrical neck 93 extending therefrom at an upward inclination. This neck 93 and the member 91, in practice, are insulated.

The neck 93 extends into a dome 94 opening into and extending upward from a drier 95 in part underlying neck 93 and extending at an inclination upwardly away from dehydrator 83. A conveyor screw 97 extends through neck 93 and into the frusto-conical member 91. The screw 97 terminates a short distance from the upper end of neck 93, against which seats a closure disc 98 slidable on a squared element 105 of shaft 99 of the screw 97. The disc 98 is provided with a central circular opening through which element 105 extends, and is restrained against rotation with shaft 99, by a pin 98a welded to the outer face of disc 98 and disposed to contact an arm of angle stop member 98b secured to the inner face of dome 94. Disc 98 is urged toward neck 93 by a compression spring 100 disposed about shaft 99 and confined between disc 98 and an abutment member 101 on shaft 99, which projects through the opposite wall of hood 94. The upper portion of shaft 99 is rotatably mounted in thrust bearings 99b of known type in a bracket 94a secured to hood 94. A sprocket 102 is secured on shaft 99, between the bearings 99b and is driven by suitable means at appropriate speed. Sealing means 103, of suitable known type, is provided about shaft 99, at the upper side of hood 94, effective for preventing leakage from hood 94 of solvent vapor about shaft 99.

A multiple armed scraper 104, at the inner face of disc 98, is slidably mounted on and fits about squared element 105 of screw shaft 99 for rotation with the latter. Shaft 107 of the ribbon conveyor screw 90 extends through the outer end wall of dehydrator 83 and has secured thereon a sprocket 108 for driving the screw conveyor comprising the shaft 107 and the ribbon 90. Sealing means (not shown) of suitable known type, which may be similar to the sealing means 103 of Figure 3, is, in practice, provided about shaft 107 at the outer end of dehydrator 83. The conveyor screw 97 feeds outward material delivered to it by the ribbon type screw conveyor 90 in the dehydrator 83 and packs such material between the outer end of screw 97 and the disc 98, thus providing a pressure plug or pack 110 of such material in the outer end portion of neck 93.

Packing the material to provide the plug or pack 110 presses a substantial portion of the solvent out of the material which solvent flows back into the dehydrator. During the pressing operation a proportionate amount of fats and oils is removed from the material with the solvent and returns with the latter to the dehydrator. In that connection, the solvent dilutes the fat and oil content of the material under treatment so as to assure substantially complete removal thereof in the subsequent pressing operation. In that manner I assure that the solvent content of the material entering the drier will be sufficiently low, relative to its water content, to assure that the solvent remaining in the material will be substantially completely removed therefrom as azeotropic vapor in the drier while also assuring that substantially all of the fat or oil content of the material is dissolved and removed therefrom before it enters the drier. That is of importance in guarding against an objectionable amount of either solvent or fat in the dried material discharged from the drier, while also guarding against objectionable loss of solvent. As the pressure on this plug 110 increases, it is effective for forcing the disc 98 away from the end of neck 93, at which time the scraper 104 breaks up the outer portion of the plug or seal pack 110 so that it readily passes downward through hood 94 into the drier 95. Neck 93 preferably is provided with interior ribs 93a effective for preventing turning of the plug 110 so that scraper 104 can break up the outer portion thereof as and for the purpose stated. The seal pack 110 also guards against flow of solvent or solvent vapor through the neck 93, which is of importance in respect to substantially complete removal of solvent from the material, in the drier. I have shown but one compacting screw and its associated seal plug pack, by way of example. In practice, two or more such screws and seal means may be connected in series, with connecting chambers between them and means for returning the expressed solvent and oils and fats to the dehydrator.

The drier 95 also is steam jacketed, this steam jacket preferably, though not necessarily, being separated into three sections of approximately equal length, to each of which steam is supplied through a suitable line or pipe 112, the condensate being taken off through a line 113 appropriately connected to the sections of the steam jacket. A ribbon type conveyor screw 115, attached to a shaft 116 is rotatably mounted in the drier 95 for moving therethrough the material delivered thereto from neck 93 of the dehydrator 83. Shaft 116 extends through the lower end wall of the drier 95 and has secured thereon a sprocket wheel 117 for driving the conveyor screw. A seal (not shown) of suitable known type is, in practice, provided about shaft 116 in its passage through the lower end wall of drier 95, as will be understood. The drier 95 is provided, at its upper end, with a downwardly extending discharge chute 118 opening into a screw conveyor 119. The chute 118 and the casing of conveyor 119 are steam jacketed, receiving steam from the upper section of the steam jacket of drier 95, condensate from the casing of conveyor 119 being taken off through a pipe 120. The screw conveyor 119 is provided with the usual screw within its casing, which screw is of substantially uniform diameter and terminates an appropriate distance from the lower or discharge end of this conveyor. The lower end of the casing 119 is normally closed by a disc 122 held seated thereon by a compression spring 123 mounted about the extension of shaft 125 of the conveyor 119 and confined between disc 122 and an abutment 126 secured on the shaft 125. A multiple armed scraper (not shown) is slidably mounted on a squared element of shaft 125 at the inner face of disc 122, in the same manner as in the screw conveyor 93. I thus provide the discharge screw conveyor 119 of the drier 95 with means assuring a seal pack therein effective for guarding against air being drawn into the drier, which would increase the load on the adsorber to an objectionable extent and reduces possibility of loss of solvent. The operation of the screw conveyor 119 is substantially the same as that of the screw conveyor associated with neck 93 of the dehydrator 83, and requires no further description.

The perchlorethylene within the dehydrator 83 is maintained at a temperature slightly above the boiling point of its azeotrope with water—about 190° F.—and the sludge delivered to the dehydrator 83 is continuously moved through this hot solvent bath. The solvent serves effectively to dissolve and thereby remove all fat content of the sludge and, also, to remove the water content thereof in the form of azeotropic vapor. The sludge is delivered to the conveyor screw 97 and is subjected thereby to a pressing operation for removing a substantial portion of the solvent and forming the seal pack 110, as above described. In this latter operation most of the solvent, containing dissolved fats and oils, is pressed from the sludge and flows back into the dehydrator 83. The sludge, with most of the solvent and fats and oils pressed therefrom, is then delivered to the lower portion of the drier 95, through which it is moved upward by the ribbon type screw 115 therein.

The material delivered to the drier 95 contains approximately from about fifteen percent to forty percent of water and from about fifty to one hundred percent of solvent by weight, that is, from about two to about four times as much solvent as water. The conveyor screw 115 is rotated at low speed, about one R. P. M. and moves the meal slowly upward through the drier 95. The two lower zones of the drier 95 are maintained at a temperature of about 260° F., and the top zone thereof is maintained at a temperature of from about 320°. The meal entering the top zone of the drier 95 is solvent free and contains about ten to twelve percent more or less, of water, as will be explained more fully later. In the top zone of the drier 95 approximately two percent of the water is driven off, so that the meal discharged from the drier, by the screw conveyor 119, is substantially solvent and fat and oil free and contains about seven to nine percent of water. The resultant dried sludge is in the form of a friable meal which contains many trace minerals not present in ordinary commercial fertilizers, which makes it valuable as a fertilizer. This meal is also hygroscopic and readily absorbs moisture so as to become inoculated with soil organisms causing it to break down so as to liberate its contained nitrogen and minerals. Further, this meal is free from all putrefacts and harmful bacteria so that it may be stored indefinitely without risk of moulding and, when used will readily become inoculated by soil bacteria so that it will give up to the soil its organic and mineral content for fertilizing purposes. Due to the fact that the fertilizer produced by the method of my invention is rendered sterile by the solvent, there is no risk to public health should it be washed into rivers, lakes or other bodies of water. By treating the raw sludge taken from primary settling tanks or in some cases the raw sewage, the necessity of digester tanks is eliminated, as is the long retention period of about thirty days or more, required under the present practice. That effects a substantial saving both in time of treatment and in cost of treating plant equipment, a serious item of expense in the case of large communities or cities of considerable size.

The azeotropic vapor evolved in the dehydrator 83 passes off through a dome 130 thereof and line 131 to the inlet of a condenser 132 of suitable known type. Due to the inclination of the drier 95 stratification occurs therein and the heavier solvent—water—azeotropic vapor sinks to the lower portion of drier 95, the azeotropic vapor being in the lower half length of the drier and the steam or water vapor remaining in the upper half portion thereof. The water vapor in the upper half portion of the drier provides the water phase of the azeotropic vapor in the lower half portion so that all absorbed heat in the lower portion is utilized to evaporate the solvent. That assures complete removal of solvent from the meal before the available heat is utilized for evaporating the water, at the higher temperature in the upper portion of the drier. The azeotropic vapor from the lower portion of drier 95 passes through dome 134 thereof and line 135 to line 131 and thence to the condenser 132. In that manner, the solvent and water driven off from the material in the lower zones of the drier are continuously removed from the latter, for removing solvent and water from the sludge meal in the manner above stated. The condensate from the condenser 132 is delivered through line 136, to a gravity water separator 137 of known type. The water from separator 137 is continuously discharged through a U line 138 and solvent from the separator 137 is delivered, through line 140 to member 91 of dehydrator 83 and sprayed onto the material passing to conveyor screw 97, to facilitate removal of fat and oil remaining therein.

A centrifugal pump 144 has its intake connected, by a line 145, to line 88, and its discharge connected by a line 146 to the inlet of a steam jacketed still 147 of suitable known type. Solvent-fat miscella is delivered by pump 144 from the dehydrator 83 to the still 147, in which it is heated to the boiling point, or above, of the solvent, which is about 250° F. The fats from the still 147 are discharged, through line 148, into a steam jacketed stripping tower or column 150, to the jacket of which steam is supplied through line 151, the condensate being taken off through line 152 and steam trap 153. Stripping steam is supplied to column 150 through line 154, for stripping from the fats any remaining traces of solvent, the steam and solvent passing from column 150 through line 156 and line 157 to line 131 and thence into the condenser 132. The fat, free of solvent, is discharged from column 150 through U line 158 and may be packaged or subjected to further treatment, as desired.

The hot solvent vapor from still 147 is delivered through line 160 to the dehydrator 83 adjacent weir 86. This solvent vapor enters the dehydrator 83 at a temperature of approximately 250° F., and supplies, in whole or in substantial portion, the solvent vapor phase of the azeotropic vapor therein. Further, the temperature of the entering hot solvent vapor drops materially below its entering temperature of 250° F.—to from about 220° F., to 205° F.—thereby rendering available a substantial portion of the 60° F., superheat of the vapor for heating the contents of the dehydrator. By returning the hot solvent vapor from the still to the dehydrator, I thus effect a substantial economy in heat required for performing the method of my invention, an important consideration in this art. The solvent within the dehydrator 83 is continuously replenished by the condensed perchlorethylene delivered thereto through line 140. While the miscella delivered through line 74 to the centrifuge contains dissolved fats, the ratio of the fat to the solvent is quite small and in no way interferes with maintaining the layer or stratum of solvent within the centrifuge as and for the purposes above described.

The water separator 137 is provided with an interior baffle 162 extending above the water level therein and spaced a short distance from the outlet end of line 136. A line 163 connects the water separator 137, above the water level therein, to the intake of a carbon adsorber 164 of suitable known type. The outlet of carbon adsorber 164 is connected to a three way valve 165 having connected thereto a steam supply pipe 166 and a discharge pipe or line 167, which is connected to the intake of a blower 168 discharging through line 169 to atmosphere. The suction line 66 is connected to line 163 between the carbon adsorber 164 and a check valve 163a of suitable known type in line 163, which check valve opens toward adsorber 164 and closes toward the water separator 137. The line 157 is connected to line 66 between line 163 and a check valve 168 in line 66. The check valve 168 opens toward the carbon adsorber 164 and closes toward the centrifuge 10. Line 157 is also provided with a check valve 170 which opens toward condenser 132 and closes toward line 66. A check valve 172 in line 160 opens toward the dehydrator 83 and closes toward still 147, and a check valve 173 in line 131, between line 135 and condenser 132, opens toward condenser 132 and closes toward line 135.

In the normal operation of the apparatus shown in Figure 1, the three way valve 165 is in its position shown, closing the steam supply line 166 and connecting line 167 to the outlet of the carbon adsorber 164. The blower 168 operates continuously and serves to maintain a desirable subatmospheric or negative pressure in the system effective to prevent loss of solvent therefrom. Solvent vapors passing to the adsorber 164 are adsorbed by the carbon and retained therein and the air discharged from the blower 168 is solvent free, substantially pure and has no objectionable odor. When it is desired to regenerate the carbon adsorber 164, the three way valve 165 is turned to its other position, closing line 167 and connecting the steam supply line 166 to the adsorber 164, blower 168 continuing in operation. The steam admitted to the adsorber 164, together with the entrained solvent and vapors, passes through lines 66 and 157 to the condenser 132, the condensate being delivered to the water separator 137. In that manner, solvent passing to the carbon adsorber 164 is recovered thereby further minimizing loss of solvent. The check valves, as well as the three way valve 165, are of suitable known type and require no detail description, suffice it to state that suitable valves and accessories of suitable known type, unless otherwise stated, are provided as desired or necessary.

I have described the method of my invention as used in the treatment of sewage sludge or sewage, for which it is particularly suitable in certain of its aspects. The method is also well suited for treating garbage which, in its usual condition, is difficult to grind. By mixing the garbage with water in substantial amount it may readily be ground and the resultant mixture of garbage and water delivered to the centrifuge and treated in the manner above described. The garbage thus treated provides valuable fats in substantial quantity and also provides a meal of high protein content which is valuable as a stock feed. In its broader aspects, the method of my invention may be used in treating any materials containing suspended solids and suitable for such treatment.

In the above description of the method of my invention, it has been assumed that the material treated contains substantial amounts of fats. Some garbage and other waste materials suitable for treatment by my method may be fat free or contain so little fat as to make recovery thereof not worthwhile. In such cases, the material may be treated in the manner above described but omitting the fat recovery step.

It will be understood that variations may be resorted to without departing from the field and scope of my invention either as to the method or the apparatus, and I intend to include all such variations, as fall within the scope of the appended claim, in this application in which the preferred form only of my invention has been disclosed.

I claim:

The method of treating an aqueous mixture of materials containing organic solids of specific gravity greater than one and fats, which comprises continuously centrifugally separating the components of said mixture into successive annular strata of solids and water and fats, continuously flushing the peripheral surface of the solids stratum with a chlorinated hydrocarbon solvent of the group comprising perchlorethylene, trichlorethylene, carbon tetrachloride and ethylene dichloride, continuously discharging the solvent and solids entrained therein while discharging water from the water stratum separately from the solvent, delivering the fats from the fats stratum to the discharged solvent, recovering the fat content of the discharged solvent, removing solvent from the discharged solids, and dehydrating the solids taken off in the discharged solvent.

References Cited in the file of this patent

UNITED STATES PATENTS

| | | |
|---|---|---|
| 693,316 | Tralls | Feb. 11, 1902 |
| 1,699,257 | Travers | Jan. 15, 1929 |
| 1,887,476 | Lindgren | Nov. 8, 1932 |
| 2,021,081 | Nagao | Nov. 12, 1935 |
| 2,067,800 | Stockton | Jan. 12, 1937 |
| 2,557,629 | Boivinet | June 19, 1951 |
| 2,599,619 | Eckers | June 10, 1952 |